United States Patent [19]

Wadsworth et al.

[11] 4,375,718
[45] Mar. 8, 1983

[54] METHOD OF MAKING FIBROUS ELECTRETS

[75] Inventors: Larry C. Wadsworth, Arlington, Tex.; Solomon P. Hersh, Raleigh, N.C.

[73] Assignee: Surgikos, Inc., Arlington, Tex.

[21] Appl. No.: 243,218

[22] Filed: Mar. 12, 1981

[51] Int. Cl.³ .................. B29J 1/00; H01T 19/00
[52] U.S. Cl. ............................. 29/592 E; 55/131; 55/155; 55/DIG. 5; 55/DIG. 39; 361/233; 264/22
[58] Field of Search .............. 29/592 E, 592 R; 55/DIG. 39, DIG. 5, 486, 131, 155; 264/22; 361/225, 233

[56] References Cited

U.S. PATENT DOCUMENTS

| | | | |
|---|---|---|---|
| 3,192,385 | 6/1965 | Antokal | 361/225 |
| 3,449,094 | 6/1969 | Baxt et al. | 55/DIG. 39 |
| 3,658,620 | 4/1972 | Hall | 264/22 |
| 3,985,914 | 10/1976 | Sasaki et al. | 427/100 |
| 3,998,916 | 12/1976 | van Turnhout | 55/131 |
| 4,069,026 | 1/1978 | Simm et al. | 55/131 |

FOREIGN PATENT DOCUMENTS

| | | | |
|---|---|---|---|
| 954347 | 4/1964 | United Kingdom | 264/22 |

*Primary Examiner*—Carl E. Hall
*Assistant Examiner*—P. W. Echols

[57] ABSTRACT

A process of manufacturing an electrostatically charged filtration medium is disclosed. A web made of nonconductive thermoplastic fibers is contacted on each side with a more conductive web to form a combined web. The combined web is charged with electrically charged particles from corona charging elements on opposite sides of the web. The charging elements are operated at a voltage of from 5 to 25 kV but with opposite polarity.

17 Claims, 5 Drawing Figures

U.S. Patent   Mar. 8, 1983   4,375,718
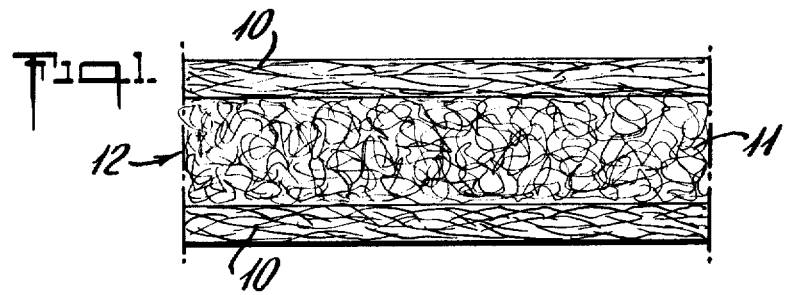
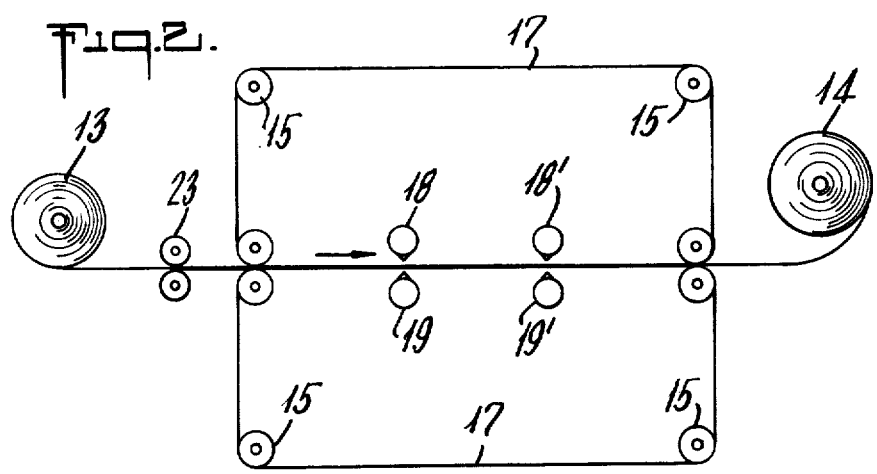
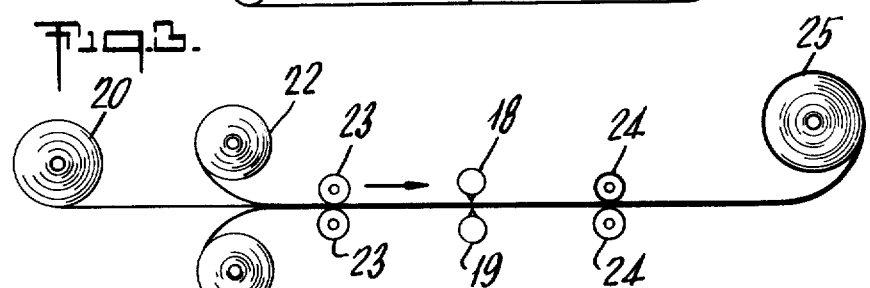
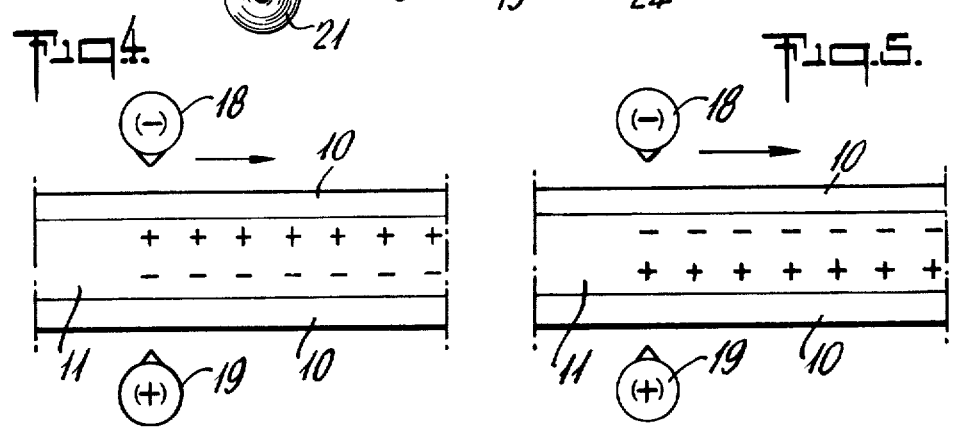

METHOD OF MAKING FIBROUS ELECTRETS

This invention relates to a method of forming fibrous electrets for use as a filtration medium.

Electrically charged fibrous materials to be used as a filtration medium have been known for some time. In U.S. Pat. No. 2,740,184, Thomas discloses a process of charging thermoplastic, fibrous webs by softening the fibers in the webs with heat and, while such fibers are soft, subjecting them to a suitable electrostatic field to produce a charged fibrous web.

U.S. Pat. No. 3,998,916 to Van Turnhout discloses a process of manufacturing electrically charged fibrous filters using a fibrous material produced from a fibrillated film. The film is heated to a temperature near its melting point and is subjected to an electrostatic charge from a plurality of corona charging elements. The charged web is then fibrillated, and the resulting fibers are collected and processed into a filter. The Van Turnhout U.S. Pat. No. 4,178,157 discloses a similar process in which the fibers are also crimped.

Simm et al U.S. Pat. No. 4,069,026 discloses an electrostatic spinning process in which fiber material is sprayed electrostatically from a liquid state and deposited on a conductive support.

U.K. Patent Application No. 2,015,253A discloses a process of forming fibrous electrets by a melt blown process in which the melt blown fibers are charged with an electrostatic charge immediately after they are formed and then deposited on a web. The patent discloses that these fibrous webs are useful as filters and specifically for face masks.

U.S. Pat. No. 3,571,679 discloses a process for forming a fibrous electret using contacting electrodes and elevated temperatures in which the electrodes are covered with weakly conductive covers made from an asbestos cement mixture to prevent arcing.

All of these references indicate that it is necessary to charge the fibrous material or fiber-forming material when the material is at a temperature near its melting point in order to trap the electric charge within the fibrous material.

SUMMARY OF THE INVENTION

According to the present invention, there is disclosed a method of applying a permanent electric charge by means of corona charging to a fibrous web when the web is at room temperature, i.e., approximately 20° C. to 25° C., which is a temperature considerably below the melting temperature of the filaments of the web. The charging is accomplished by applying a contact web, which is more conductive than the dielectric fibers of the filtration medium, to the filtration medium and applying the charge by corona charging through the more conductive medium.

The filtration medium is composed of fibers which have dielectric properties. The contact web, which is in contact with such fibers, is composed of material which will conduct the electrical charge to the dielectric filtration medium. The fibers in the dielectric filtration medium are thermoplastic and are made of a polyolefin such as polypropylene or polyethylene or may be made from polycarbonates or polyhalocarbons. The contact web may be a woven or nonwoven web made of cellulosic fiber such as cotton, rayon, woodpulp or hemp or mixtures of these fibers, or may be a nonwoven web made from highly dielectric fibers but bonded together with a conductive binder. The nonwoven webs contain an adhesive binder. The contact web will conduct the electrostatic charge but has poorer dielectric properties than the filtration medium fibers and will not maintain any significant charge.

The room temperature or cold charging of fibrous electrets according to the present process offers certain advantages over the elevated temperature or hot charging of fibrous electrets according to the prior art patents mentioned above. With a cold charging system, a greater range of fibrous materials can be easily charged to form a filtration medium. The fibrous webs need not be melt-blown or fibrillated films but may be formed into webs by any of the standard nonwoven fabric processing techniques such as air laying, carding, or spun bonding, as well as webs formed from fibrillated films or melt-blown webs. The ability to charge webs of different constructions allows a processor greater flexibility in making a filtration medium than would be available to the processor employing a hot-charging technique where the charge is applied to the fiber of the web when the fiber is made. It is also possible, using the cold-charging technique, to process or reprocess filtration webs which may have previously been charged and whose charge has been dissipated by inadvertence or upon aging of the webs. The contact dwell time, that is, the time during which the fibrous web is subject to the corona charging, can be varied in the present process. Generally, it is a much longer period than in the prior art process. For example, the contact or dwell time in the process disclosed in U.S. Pat. No. 4,215,682 is less than one millisecond, and the dwell time in the present process is from about 0.01 to 1 seconds. Because of the greater dwell time in the present process, there is a better opportunity for the fibers to acquire a charge.

The electrostatic charge is applied to the fibrous web using corona discharge bars. These bars have point emitters which produce a corona in the vicinity of the bars causing the air around the bars to ionize thereby forming charged particles. These charged particles will migrate to the contact web and induce or convey a charge to the filtration medium. The charge bars have a voltage of from 5 to 25 kV. There is at least one charging bar on each side of the web, and they are preferably maintained at the same potential level but with opposite polarity.

Contrary to the indications in the prior art references that the application of an electrostatic charge to a fiber after the fiber has been fully formed will not be permanent, applicants have found that by applying the charge according to the process of the present invention the charge is permanent, and the filtration webs produced by the present process have maintained their charge as long as filtration webs produced by the prior art processes.

BRIEF DESCRIPTION OF DRAWINGS

FIG. 1 is a cross-sectional view of a filtration medium made in accordance with the present invention.

FIG. 2 is a schematic illustration of the process for carrying out the present invention.

FIG. 3 is a schematic illustration of another embodiment for carrying out the process of the present invention.

FIGS. 4 and 5 are illustrations showing the charge that is applied to the filtration medium.

Electret fibrous filters are highly efficient in filtering air because of the combination of mechanical entrapment of particles in the air combined with the trapping of particles based on the electrical or electrostatic characteristics of the fibers. Both charged and uncharged particles in the air, of a size that would not be mechanically trapped by the filtration medium, will be trapped by the charged nature of the filtration medium. The filtration medium is composed of fibers which have dielectric properties. The fibers are made from thermoplastic polymers which are hydrophobic and thermally stable over temperatures which will be encountered in conditions of use. These polymers are preferably polypropylene or polyethylene. The fibers themselves may be formed by any one of the commonly employed methods of forming fibers. The fibers may be initially collected as individual filaments and subsequently formed into a web, or they may initially be formed as a nonwoven fibrous web. If the fibers are initially collected as individual filaments, the filaments may be processed into webs by any of the common nonwoven fabric manufacturing processes. These include air laying, carding, or other known nonwoven fabric manufacturing processes. The nonwoven webs may be bonded with an adhesive binder as long as the binder will not interfere with the ability of the web to maintain its dielectric properties.

The fibers that are used in the filtration medium may be of any size which is normally made by a particular fiber-making process. For example, melt-blown fibers are usually from about 0.3 to 5 microns in diameter and are usually made in a length of several inches. Spun-bonded fibers are about 5 to 50 microns in diameter and are usually made in continuous lengths. If the fibers are of the type that are formed into webs by carding, they are usually made in sizes of approximately 10 to 30 microns, and their length may be from approximately $\frac{1}{4}$ to 1 9/16 inches. If a wet-laid process is employed to manufacture the webs of the filtration medium, the fiber length may be from approximately $\frac{1}{8}$ inch to 1 9/16 inches. In general, the fibers that are useful in this process may have a diameter from approximately 0.3 microns to about 50 microns. It should be understood, that for particular filter applications, a particular diameter fiber may be more advantageous to employ than a fiber of a different diameter.

The weight of the webs that may be employed as the filtration medium may vary over a wide range. If the filtration medium is to be used as a surgical face mask, the weight of the medium would be from about 0.4 ounce per square yard to about 1 ounce per square yard. If the filtration medium is to be used in an industrial or home filter, the weight may vary from about 3 ounces to about 6 ounces per square yard.

The difference in the conductivity between the dielectric filtration medium and the contact web is expressed as a difference in the resistivity of the materials. The volume resistivity of the filtration medium is greater than about $10^{16}$ ohm-cm. The resistivity of the contact webs is about $10^{10}$ to about $10^{13}$ ohm-cm. It has been empirically determined that the resistivity of the filtration web should be at least $10^3$ times the contact web's resistivity.

The contact webs which are used in the present process may be woven or nonwoven webs made from cottom, rayon, or mixtures of cotton and rayon with woodpulp or other fibers such as hemp and may contain conductive fibers containing dispersed carbon. These webs, if nonwoven, may be bonded by any conventional, nonwoven bonding system which may employ a hydrophilic or hydrophobic binder. The contact web which is employed in the present process does not maintain the charge which is maintained by the filtration web. The nonwoven contact webs may also be made from non-cellulosic fibers such as polyethylene, polypropylene, polyamide or polyester and bonded with a binder that is conductive so that the conductivity of the contact web is greater than the conductivity of the filtration medium web. The weight of the contact web may vary from 0.3 ounces per square yard to about 6 ounces per square yard.

The present process may be better understood by reference to the drawings.

In FIG. 1 there is shown a partial cross-section 12 of filtration medium 11 with a contact web 10 on each side of the filtration medium. These webs are in contact with the filtration medium during the time that the composite web is subjected to the electrostatic charging elements.

FIG. 2 shows one embodiment of the process for manufacturing the filtration elements of the present invention. A source of filtration medium web 13 is unwound and passed between rollers 23 where it is brought into contact with contact webs 17. There is a contact web 17 on each side of the filtration web 13. The webs are then brought into proximity of two corona discharging units 18 and 19. There may be an additional set of corona discharging bars 18' and 19' as hereinafter described. The corona discharging units are spaced from the webs 17 a distance of approximately $\frac{1}{4}$ to $2\frac{1}{4}$ inches. The distance should be such that the voltage applied to the corona discharge elements will not jump the air gap between the corona discharge elements. This distance is dependent not only on the space but also on the voltage of the elements. As the distance between opposing bars is increased, the voltage on the bars may be increased. The discharge elements are charged at a level of from approximately 5 to 25 kV. The discharge elements are normally in balance, that is both elements 18 and 19 are at the same charge voltage, but the elements have opposite polarity. If element 18 has a positive charge, then element 19 has a negative charge. It is possible to apply a charge to the filtration medium with the opposing charging units at different voltages. There should be some voltage applied to both charging units and the voltage on opposite sides of the web must be of the opposite polarity.

Multiple charge bars 18, 18' and 19, 19' on each side of the web may also be employed. The bars on the same side of the web should be spaced apart a sufficient distance so that there is no arcing between adjacent bars. The adjacent bars may have the same charge or an opposite charge and may be charged at different voltage levels. The bars on the opposite side of the web must have opposing charges. An adequate spacing between adjacent charge bars is from about 5 to about 10 inches. After the charge has been applied to the web, the contact webs are separated from the filtration medium by passage over rollers 15 and the filtration medium is wound on reel 14. As shown in FIG. 4, the charge that the present process applies to the surface of the filtration medium may be opposite the polarity of the charging bar nearest the surface. That is, if charging bar 18 (FIG. 2) is negatively charged, the surface of the filtration medium closest to the bar 18 will be positively charged. This is known as heterocharging as contrasted to homocharging where the charge on the medium would be of the same polarity as the charging bar. Heterocharging has not previously been observed to occur while employing any type of corona or charge deposition or injection charging process. It has been observed only as a result of dipole alignment or charge separation in thermal charging processes using contact electrodes.

Under some conditions of operation of the present process, the surface of the filtration medium nearest to the positive charging bar retains a positive charge, which is illustrated in FIG. 5. This is homocharging. Generally, if the contact web is thin and is made of fibers which are polar in nature, e.g., cellulosic or polyamide, heterocharging will occur. If the contact web is thick, for example a cotton print cloth or is made of non-polar or hydrophobic fibers, polyester, polyethylene, etc., homocharging will occur. The filtration efficiency of the filtration medium is substantially identical regardless of whether the charging process is homocharging or heterocharging.

An alternate method of forming the filtration webs of the present invention is shown in FIG. 3. In the method shown in this figure, the contact webs are not separated from the filtration web after charging but are retained on the web and become part of the final filtration unit. This method is especially useful in the manufacture of surgical face masks. A source of filtration medium 20 is unwound and brought into contact with two facing layers which are unwound from rolls 21 and 22. The three layers pass between rollers 23, which bring the facing layers into contact with the filtration medium. The combined webs are then passed in proximity to the corona discharge elements 18 and 19.

The contact webs become the facing layers of the surgical face mask. In a typical surgical face mask, the contact webs would be nonwoven fabrics made from rayon fibers. The rayon fibers are conductive. The combined web is subsequently passed through rollers 24 and then wound on reel 25. In the manufacture of face masks, the web would be unwound from the roll 25, cut to size, folded and a seam of binding and ties applied. If desired, the web can be fed directly from the charging station to a face mask manufacturing station.

In either of the above-mentioned processes, the line speed of the web passing in proximity to the corona charging elements can be varied over a relatively wide range. In general, the line speeds can be from about 5 to 60 feet per minute, and in some instance, if the web is very thin, the line speeds can be in excess of 100 feet per minute. The contact webs will not retain any significant electrostatic charge after they are removed from proximity of the corona charging bars.

In the following Examples, the filtration efficiency of the webs was tested by two different methods. The test reported as "B.E.E." is a bacterial filtration efficiency test. This test is run in the following manner. *Staphylococcus aureus* bacteria are nebulized into a spray mist and forced through an aperture in a closed conduit. The bacteria passing through the aperture are trapped on a Millipore Filter and then innoculated on agar plates. The same procedure is repeated with the filtration medium to be tested blocking the aperture of the conduit. After a period of 24–48 hours, the bacteria colonies are counted. The efficiency of the filtration medium is determined by comparing the colony count on the plates with and without the filtration medium in the aperture. The results are expressed as a percentage which represents the reduction of the bacteria colonies when the filtration medium is in place. The test reported as "F.E.T." is a test employing uniform polymer latex microspheres dispersed in water in place of the bacteria of the B.F.E. test. An aerosol of the polymer particles dispersed in water is diluted in an air stream which is then passed through a filtration medium holding device and then to a particle counter where the polymer particles are counted. Before the air stream reaches the particle counter, the liquid water in the system is evaporated and removed from the air stream. A sample of the filtration medium to be tested is then inserted in the holding device, and the air stream is again directed to the particle counter. The difference in the particles counted with and without the filtration medium in place is an indication of the efficiency of the filtration medium and is expressed as a percentage of the particles removed from the air stream by the filtration medium. Of the two tests, the F.E.T. test, because it does not have the variables of a biological test, gives more reproducible results.

The following Examples show the effect of cold charging on the filtration efficiency of a filtration medium prepared according to the present invention compared to the same webs which were not charged and to webs which were charged without the contact web in contact with the filtration medium. Examples 2–6 in Table 1 were all charged with a contact web on each surface of the filtration media during charging. The medium in Examples 2–6 was a melt blown polypropylene web. It should be noted that in Example 4 the polarity of the charge bars was identical and that the filtration efficiency of the resulting web was inadequate.

TABLE 1

| A. Laminate[1] Weight and Charge Conditions | | | | |
|---|---|---|---|---|
| Example | Web Weight Oz./Sq.Yd. | Top Bar kV | Bottom Bar Kv | Space From Web (Inches) | Speed of Web Ft/Min. |
| 1 | 2.44 | No Charge | | | |
| 2 | 2.49 | −18 | +18 | 2.5 | 30 |
| 3 | 2.46 | −10 | +10 | 2.5 | 30 |
| 4 | 2.46 | +18 | +18 | 2.5 | 30 |
| 5 | 2.59 | −18 | +18 | 2.5 | 60 |
| 6 | 2.52 | −18 | +18 | 2.5 | 15 |

| B. Data | | |
|---|---|---|
| | Surface Potential[2] (Volts) | | Latex Microsphere |
| Example | Top[3] | Bottom[4] | Filtration Eff. (F.E.T.) |
| 1 | −40 | −30 | 40.9 |
| 2 | +785 | −20 | 95.2 |
| 3 | +320 | +140 | 95.9 |
| 4 | −5 | −15 | 51.3 |
| 5 | +625 | −45 | 95.2 |
| 6 | +740 | −300 | 95.8 |

[1] Laminate weights in examples 1–6 include weight of filtration medium plus 1.23 oz./sq. yd. combined weight of both facings.
[2] Voltage potentials measured on the media after the facings were removed with a Keithley Model 2501 Static Detector Head and a Model 621 Electrometer. The media samples were placed on a grounded steel plate, and the surface potential of the surface opposite the steel plate is measured.
[3] Side of filter medium closest to top charge bar.
[4] Side of filter medium closest to bottom charge bar.

In the following Table 2, the filtration media in Examples 8 and 9 were charged directly without a contact web. All other charged examples in Table 2 were charged in contact with a cellulosic contact web. All filtration tests and air resistance tests were performed on laminates consisting of filter media plus two facings. Examples 8 and 9 were laminated after charging.

TABLE 2

| A. Laminated[1] Weight and Charge Conditions | | | | |
|---|---|---|---|---|
| Example | Web Weight Oz./Sq.Yd. | Top Bar kV | Bottom Bar kV | Space From Web (Inches) | Speed of Web Ft/Min. |
| 7 | 2.15 | No Charge | | | |

TABLE 2-continued

| | | | | | |
|---|---|---|---|---|---|
| 8 | 2.11 | −12 | +12 | 1.5 | 15 |
| 9 | 2.15 | −12 | +12 | 1.5 | 15 |
| 10 | 2.14 | | No Charge | | |
| 11 | 2.20 | −12 | +12 | 1.5 | 5 |
| 12 | 2.15 | −12 | +12 | 1.5 | 10 |
| 13 | 2.13 | −12 | +12 | 1.5 | 30 |
| 14 | 2.14 | −12 | +12 | 1.5 | 60 |

B. Data

| | Surface Potential[2] (Volts) | | Filtration Eff. (%) | | Air Resistance (in. water) |
|---|---|---|---|---|---|
| Example | Top[3] | Bottom[4] | F.E.T. | B.F.E. | |
| 7 | −47 | −40 | 58.0 | 64.0 | 0.22 |
| 8 | +70 | −37 | 78.0 | 83.6 | 0.21 |
| 9 | +197 | −167 | 80.2 | 82.2 | 0.21 |
| 10 | −37 | −27 | 48.6 | 68.4 | 0.23 |
| 11 | +267 | +23 | 95.5 | 97.9 | 0.26 |
| 12 | +400 | −120 | 94.9 | 97.1 | 0.25 |
| 13 | +227 | +77 | 95.5 | 97.3 | 0.23 |
| 14 | +167 | +163 | 95.5 | 98.0 | 0.24 |

[1]Laminate weights in examples 7–14 include weight of filtration medium plus 1.15 oz./sq. yd. combined weight of both facings.
[2]Voltage potentials were measured as set forth in Note[2] of Table I on the media after the facings are removed with a Keithley Model 2501 Static Detector Head and a Model 621 Electrometer.
[3]Side of filter medium closest to top charge bar.
[4]Side of filter medium closest to bottom charge bar.

All surface potential measurements in the Examples shown in Tables I and II were performed on the media after the facings were removed as described by Weiss and Thibodeaux in "Cotton as an Electret," *Textile Res. J.*, 47, 471–476, (1977). The uncharged examples 1, 7 and 10 all had less than 50 negative volts of surface potential on both sides of the filtration medium, and the filtration efficiencies were likewise rather low with F.E.T. values of 40.9, 58.0 and 48.6%, respectively. The slight negative charges on the uncharged medium are attributable to triboelectric and separation charges resulting from contact potential difference between different materials. On the other hand, the cold charged laminate samples 2–6 and 11–14 all had positive potentials on the top surface of the filtration medium nearest to the negative charge bar, ranging from +167 to +785 volts. The filtration efficiencies of all cold charged laminates were considerably improved over that of the uncharged laminates with F.E.T. values of the charged laminates ranging from 94.9 to 95.9%, and In Vitro Bacterial Filtration Efficiencies of (B.F.E.) ranging from 97.1 to 98.0%. In contrast, the filtration medium which was cold charged without facings (Examples 8 and 9) generally had lower surface potentials than the filtration medium of the cold charged laminates, with the resultant charges being either heteropolar or homopolar, Examples 8 and 9 being heteropolar. The corresponding filtration efficiencies of the examples and other unreported tests were only of intermediate levels between uncharged and cold charged laminate with F.E.T. values ranging from 61.1–80.2%, with a single sample having a F.E.T. value in the 90–92% range.

EXAMPLE 15

Samples of a 1 ply, 2 ply and 4 ply carded, unbonded polypropylene fiber web were placed in contact with a layer of a rayon nonwoven contact web on each side of the polypropylene web and tested for filtration efficiency by the F.E.T. test. Identical samples were then charged under the process conditions set forth for Examples 8 and 9 and tested for filtration efficiency. The total weight of the contact webs for each sample was 1.23 oz./sq. yd. The weight of the laminate of polypropylene web and contact web and the results of the F.E.T. are shown in the following Table 3.

TABLE 3

| | Laminate Weight | F.E.T. % | |
|---|---|---|---|
| | oz./sq. yd. | Uncharged | Charged |
| 1 ply polypropylene | 1.74 | 0.0 | 42.4 |
| 2 ply polypropylene | 1.95 | 35.9 | 59.6 |
| 4 ply polypropylene | 2.88 | 66.9 | 96.4 |

EXAMPLE 16

A series of different woven and nonwoven webs were placed in contact with a melt blown polypropylene filtration medium. The laminates were charged according to the process of this invention with the charging bars at 18 kV, a spacing of 2.5 inches and at a line speed of forty feet per minute. Samples of each laminate were tested for filtration efficiency by the F.E.T. test. In some samples, the contact web was removed prior to the F.E.T. test and replaced with a standard rayon nonwoven facing material for testing. In addition, the volume resistivity of each facing was determined in a Keithley Model 6105 Resistivity Chamber. The results are reported in Table 4.

TABLE 4

| Contact Web | Facing Used for Testing F.E.T. | F.E.T. % | Volume Resistivity ohm-cm |
|---|---|---|---|
| Rayon Nonwoven | Same Rayon | 99.7 | $6.7 \times 10^{10}$ |
| Spunbonded Nylon 0.3 oz./sq. yd. | Nonwoven | 99.0 | $2.2 \times 10^{13}$ |
| Spunbonded Nylon 0.3 oz./sq. yd | Same Rayon | 98.9 | $2.2 \times 10^{13}$ |
| Spunbonded Nylon 0.5 oz./sq.yd. | Nonwoven | 99.4 | $1.4 \times 10^{13}$ |
| Spunbonded Nylon 0.5 oz./sq.yd. | Same Rayon | 99.4 | $1.4 \times 10^{13}$ |
| Cotton Print Cloth | Nonwoven | 99.0 | $9.5 \times 10^{10}$ |
| Woven Polyester with Conductive Dispersed Carbon Filaments | Rayon Nonwoven | 96.8 | $1.4 \times 10^{13}$ |
| Woven Polyester/Cotton/ Conductive Dispersed Carbon Fiber Blend | Rayon Nonwoven | 98.8 | $1.9 \times 10^{11}$ |

EXAMPLE 17

Samples of a melt blown polypropylene filtration medium were joined with a rayon nonwoven contact fabric on each side of the filtration medium. The combined weight of the contact fabric was 1.15 oz./sq. yd. The combined web was passed between two sets of corona charging bars and the polarity of the charging bars was varied. Under configuration No. 1, the upper bars were both negatively charged. Under configuration No. 2, the upper bars were both positively charged. Under configuration No. 3, the first upper bar was positively charged, and the second upper bar was negatively charged. The lower bars were always charged to the opposite polarity of the bar on the opposite side of the web. The charge was 18 kV on all bars, and the spacing of opposing bars was 2.5 inches, and the spacing of adjacent bars was 5 and 9/16 inches. The F.E.T. of the laminates was determined and showed that the particular placement configuration of the charging bars had no deleterious effect on the F.E.T. of the laminates. The results are reported in Table 5.

TABLE 5

| Charge Bar Configuration | F.E.T. % |
| --- | --- |
| No charge | 68.3 |
| No. 1 | 98.6 |
| No. 3 | 98.0 |
| No. 2 | 99.0 |
| No. 3 | 98.5 |
| No. 3 | 98.8 |
| No. 2 | 99.2 |

EXAMPLE 18

To demonstrate the ability of filtration media made by the process of the present invention to maintain their filtration efficiency on aging, filtration media made by the present process were aged for twelve weeks at a temperature of 120° F. and 90% relative humidity. The results are shown in Table 6.

TABLE 6

| Weeks Aging | Filtration Efficiency % B.F.E. |
| --- | --- |
| 1 | 97.1 |
| 2 | 93.4 |
| 3 | 96.9 |
| 4 | 95.7 |
| 5 | 89.6 |
| 6 | 95.2 |
| 7 | 93.9 |
| 8 | 89.8 |
| 9 | 92.7 |
| 10 | 89.5 |
| 11 | 94.3 |
| 12 | 94.1 |

We claim:

1. A process of making a filtration web comprising:
   joining a fibrous conductive web to each surface of a web of filtration medium,
   the web of filtration medium comprising thermoplastic fibers having a diameter of from 0.3 to 80 microns,
   charging one surface of the joined web with electrically charged particles from a pair of corona charging elements with a first corona charging element connected to a voltage of from 5 to 25 kV,
   charging the opposite surface of the joined web with electrically charged particles with a second corona charging element connected to a voltage of from 5 to 25 kV but with the opposite polarity as that of the first element.

2. The process of claim 1 in which the conductive web is removed from contact with the filtration medium after charging.

3. The process of claim 1 in which the second corona charging element is connected to the same voltage as the first element but with the opposite polarity.

4. The process of claim 1 in which the filtration medium is composed of polyolefin fibers.

5. The process of claim 1 in which the voltage applied to the corona charging elements is between 10 and 20 kV.

6. The process of claim 4 in which the polyolefin fibers are polypropylene, the major portion of which are between 0.3 and 5 microns in diameter.

7. The process of claim 6 in which the weight of the filtration medium is between 0.4 and 4 ounces per square meter.

8. The process of claim 1 in which the joined web is charged by a second pair of corona charging elements which are connected to voltages of from 5 to 25 kV and with the elements having opposite polarity.

9. A process of applying a permanent electrostatic charge by corona charging to a dielectric fiber web,
   joining a contact web, which is more conductive than said dielectric fiber web, to each surface of said dielectric fiber web to form a combined web,
   moving the combined web between a first pair of corona discharge elements which are charged with a voltage of from 5 to 25 kV but with the discharge elements having opposite polarity,
   maintaining the combined web in the corona of the corona discharge elements for from 0.01 to 1 seconds to produce a permanent charge on said dielectric fiber web.

10. The process of claim 9 in which the volume resistivity of the contact web is less than the volume resistivity of the dielectric fiber web by a factor of at least $10^3$.

11. The process of claim 9 in which corona charging elements are connected to equal voltages with opposite polarity.

12. The process of claim 9 in which the contact web is a cellulosic fabric and is permanently attached to the dielectric fiber web.

13. The process of claim 9 in which the dielectric fiber web is composed of polyolefin fibers.

14. The process of claim 9 in which the voltage applied to the discharge elements is between 10 and 20 kV.

15. The process of claim 13 in which the polyolefin fibers are polypropylene, the major portion of which are between 0.3 and 5 microns in diameter.

16. The process of claim 9 in which the temperature of the webs during charging is at room temperature.

17. The process of claim 9 in which the combined web is moved between a second pair of corona charging elements which are connected to a voltage of from 5 to 25 kV and with the elements on opposite sides of the web having opposite polarity.

* * * * *